Jan. 8, 1957
P. E. FISCHER ET AL
2,776,607
MECHANISM FOR PREPARING BLANKS
Filed March 31, 1952
15 Sheets-Sheet 1
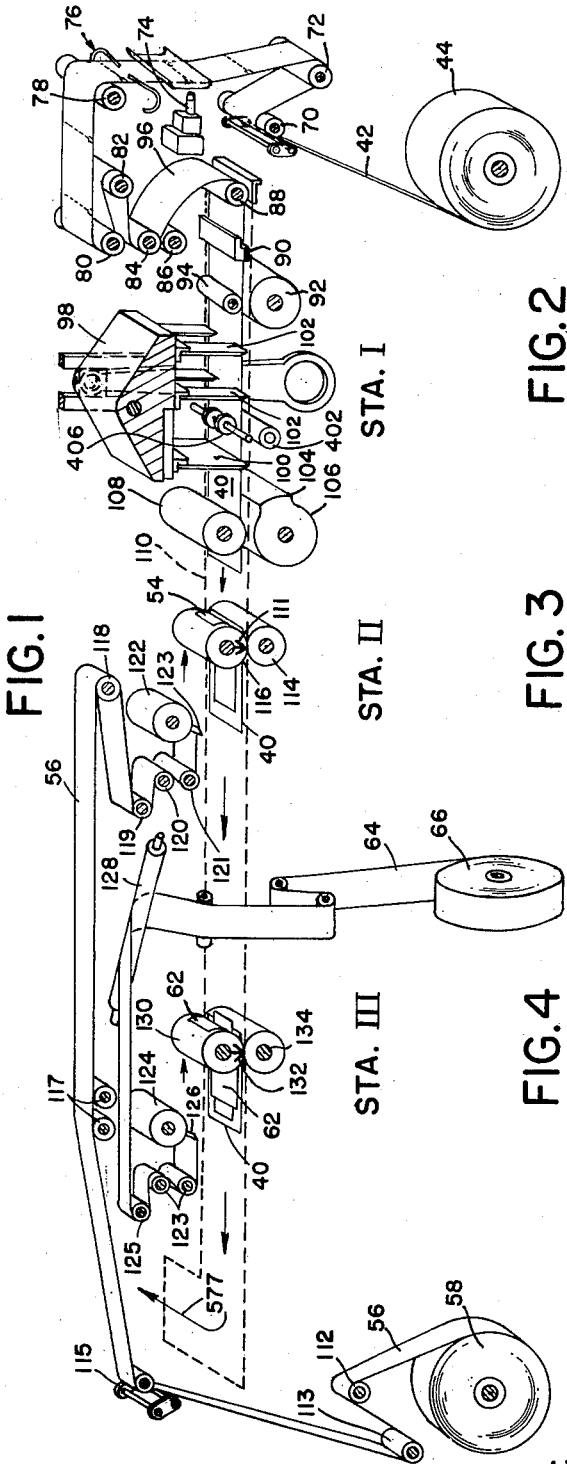
INVENTORS
PAUL E. FISCHER
ROBERT S. HEDIN
CHARLES H. SWANSON
HENRY E. WISSMAN
BY William C. Strieber ATTORNEY

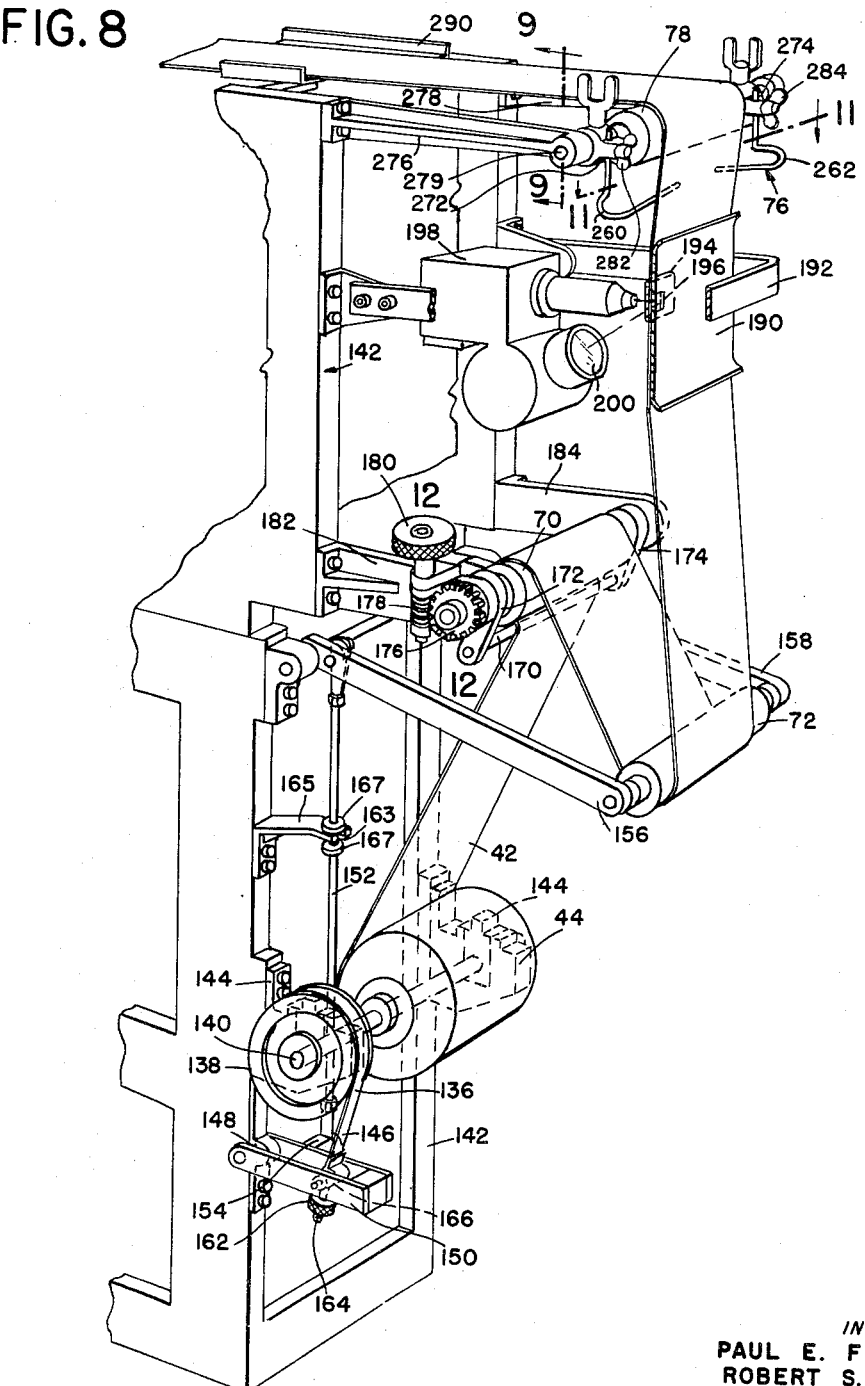

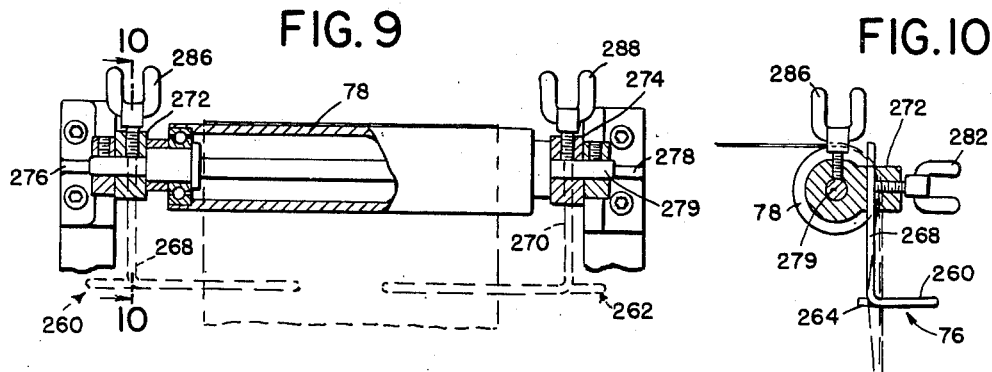
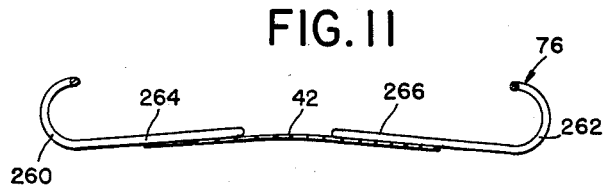
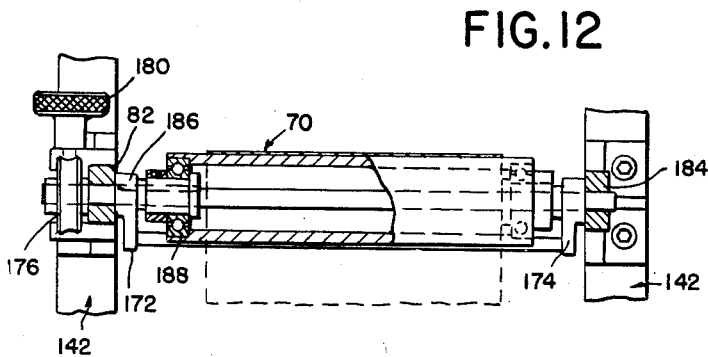
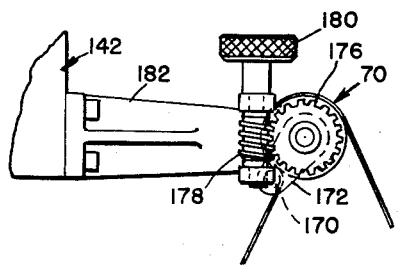

Jan. 8, 1957 P. E. FISCHER ET AL 2,776,607
MECHANISM FOR PREPARING BLANKS
Filed March 31, 1952 15 Sheets-Sheet 4
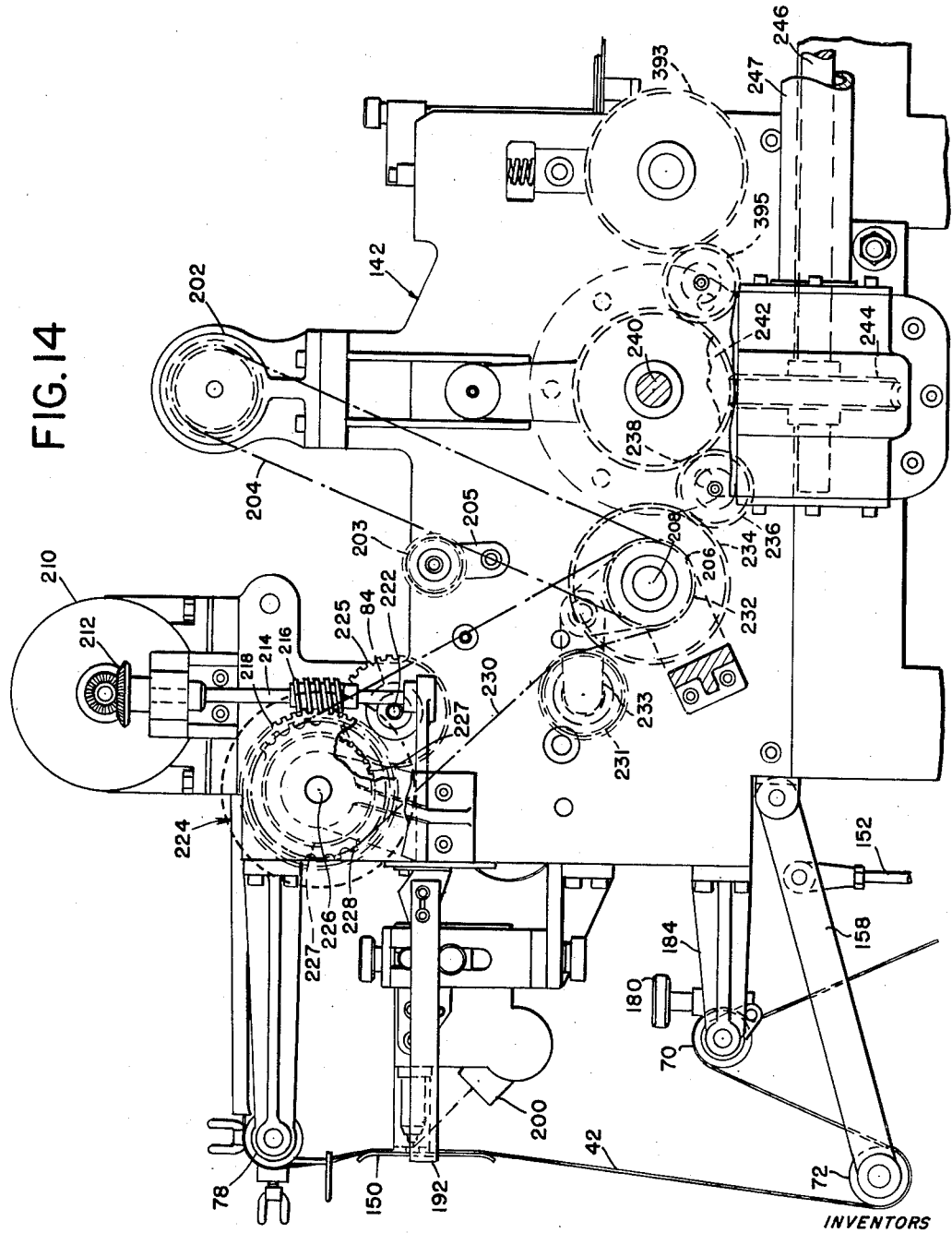
INVENTORS
PAUL E. FISCHER
ROBERT S. HEDIN
CHARLES H. SWANSON
HENRY E. WISSMAN
BY William C. Strieber ATTORNEY

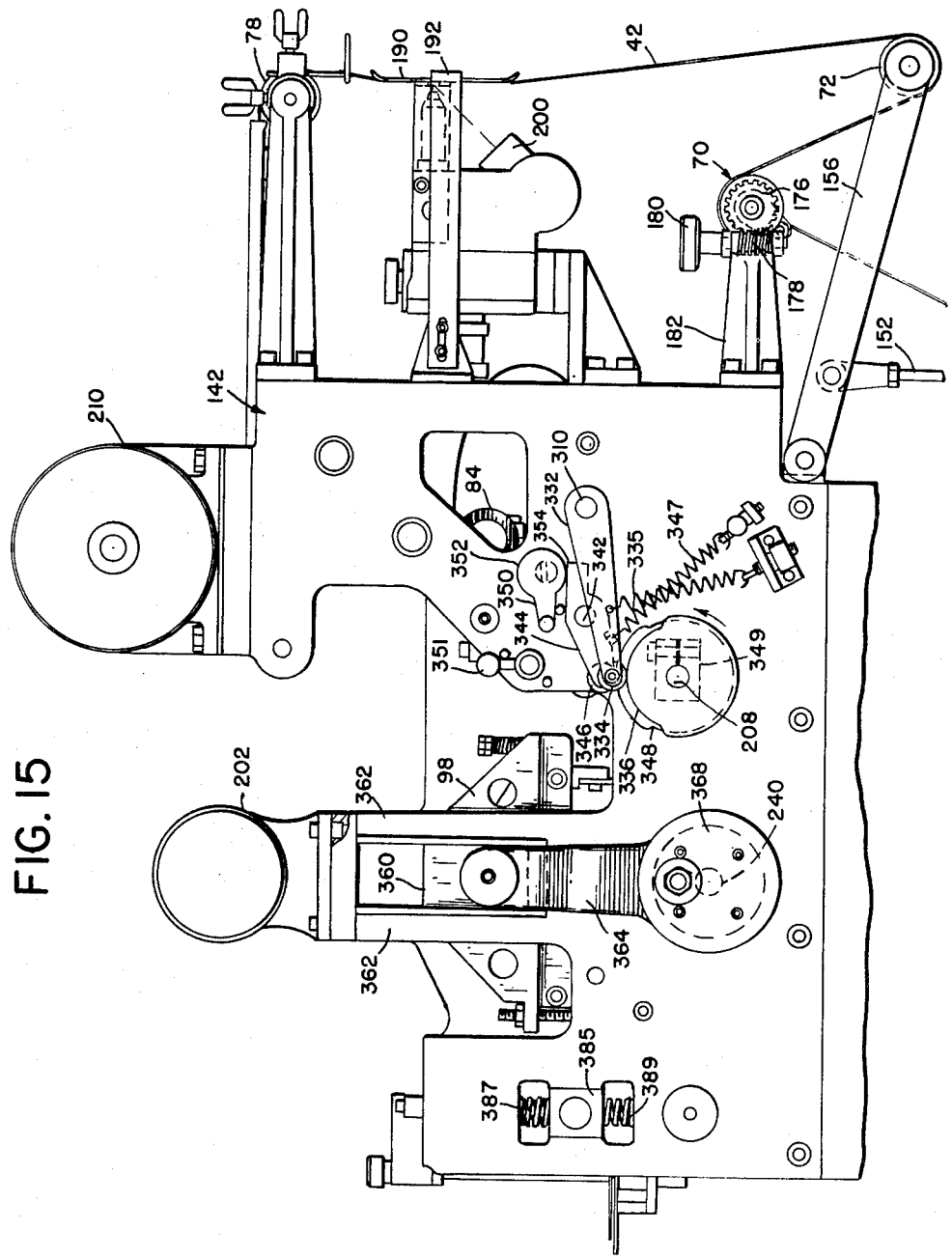

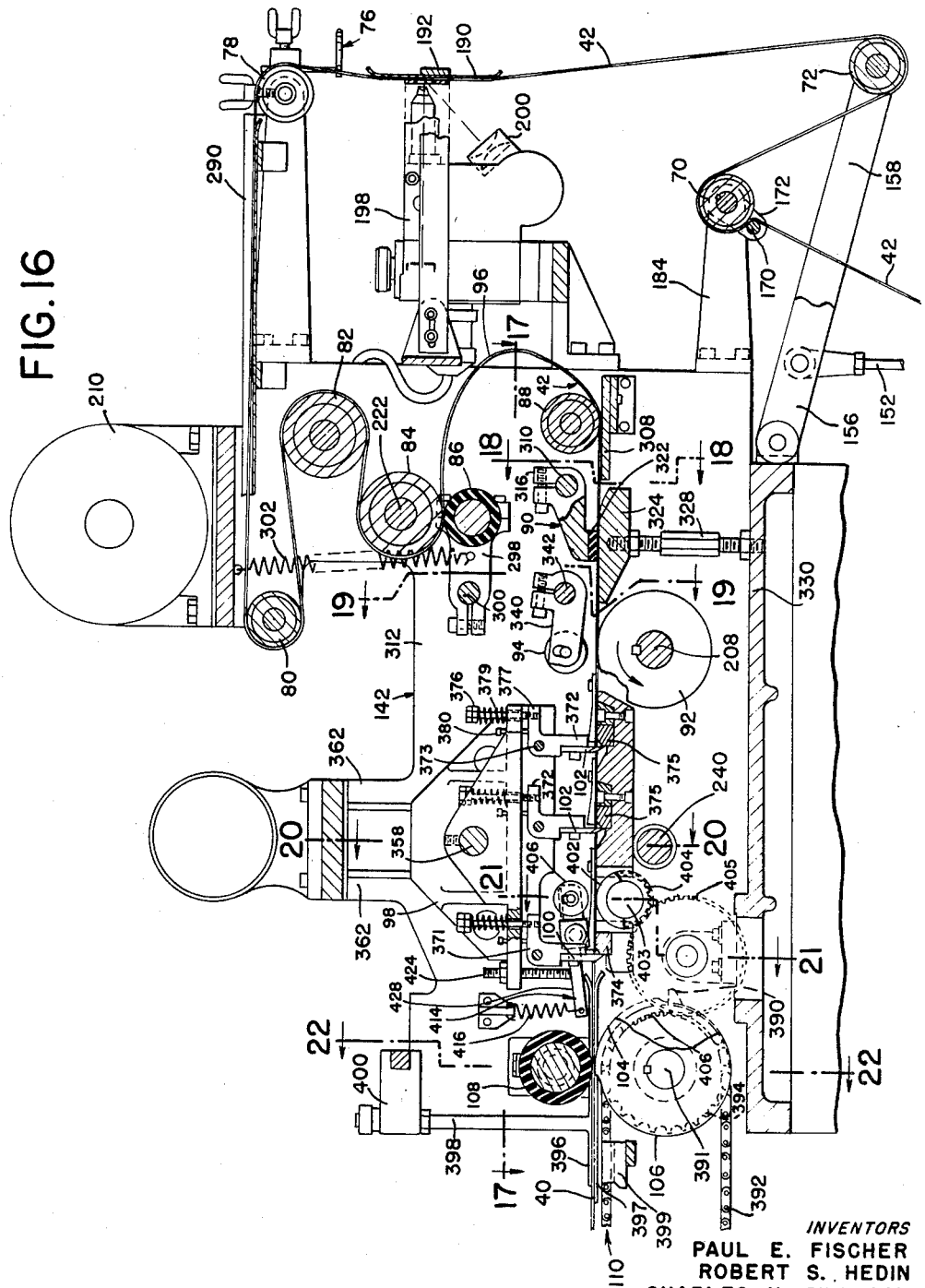

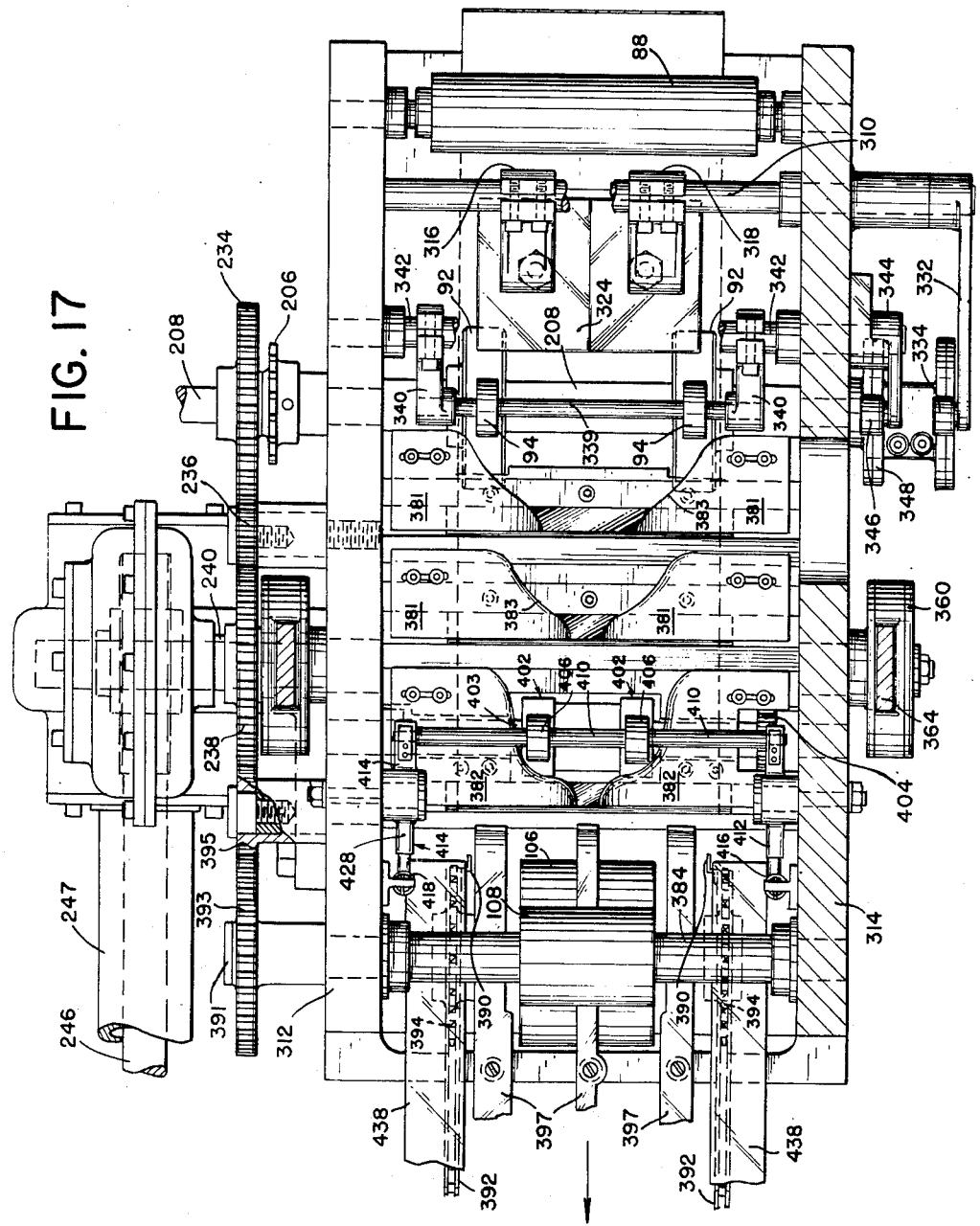

Jan. 8, 1957   P. E. FISCHER ET AL   2,776,607
MECHANISM FOR PREPARING BLANKS
Filed March 31, 1952   15 Sheets-Sheet 8

INVENTORS
PAUL E. FISCHER
ROBERT S. HEDIN
CHARLES H. SWANSON
HENRY E. WISSMAN

BY William C. Stueber ATTORNEY

Jan. 8, 1957 P. E. FISCHER ET AL 2,776,607
MECHANISM FOR PREPARING BLANKS
Filed March 31, 1952 15 Sheets-Sheet 9

INVENTORS
PAUL E. FISCHER
ROBERT S. HEDIN
CHARLES H. SWANSON
HENRY E. WISSMAN

BY *William C. Stueber* ATTORNEY

Jan. 8, 1957  P. E. FISCHER ET AL  2,776,607
MECHANISM FOR PREPARING BLANKS
Filed March 31, 1952  15 Sheets-Sheet 10

INVENTORS
PAUL E. FISCHER
ROBERT S. HEDIN
CHARLES H. SWANSON
HENRY E. WISSMAN

BY William C. Stieber ATTORNEY

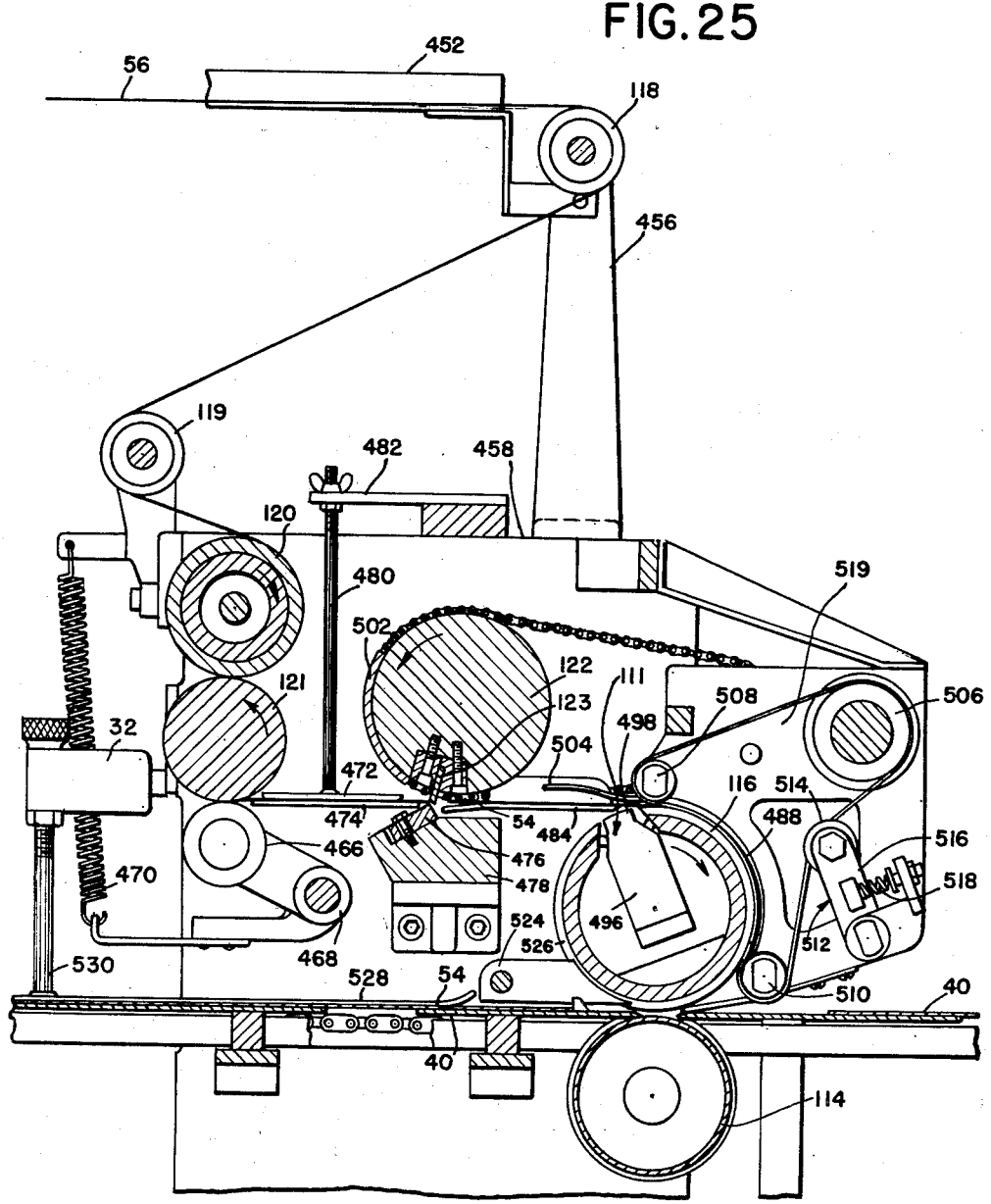

Jan. 8, 1957

P. E. FISCHER ET AL 2,776,607

MECHANISM FOR PREPARING BLANKS

Filed March 31, 1952

INVENTORS
PAUL E. FISCHER
ROBERT S. HEDIN
CHARLES H. SWANSON
HENRY E. WISSMAN

BY *William C. Stueber* ATTORNEY

Jan. 8, 1957 P. E. FISCHER ET AL 2,776,607
MECHANISM FOR PREPARING BLANKS
Filed March 31, 1952 15 Sheets-Sheet 13

FIG.27

INVENTORS
PAUL E. FISCHER
ROBERT S. HEDIN
CHARLES H. SWANSON
HENRY E. WISSMAN

BY *William C. Stueber* ATTORNEY

Jan. 8, 1957  P. E. FISCHER ET AL  2,776,607
MECHANISM FOR PREPARING BLANKS
Filed March 31, 1952  15 Sheets-Sheet 14

INVENTORS
PAUL E. FISCHER
ROBERT S. HEDIN
CHARLES H. SWANSON
HENRY E. WISSMAN

BY William C. Strueber ATTORNEY

Jan. 8, 1957 P. E. FISCHER ET AL 2,776,607
MECHANISM FOR PREPARING BLANKS
Filed March 31, 1952 15 Sheets-Sheet 15
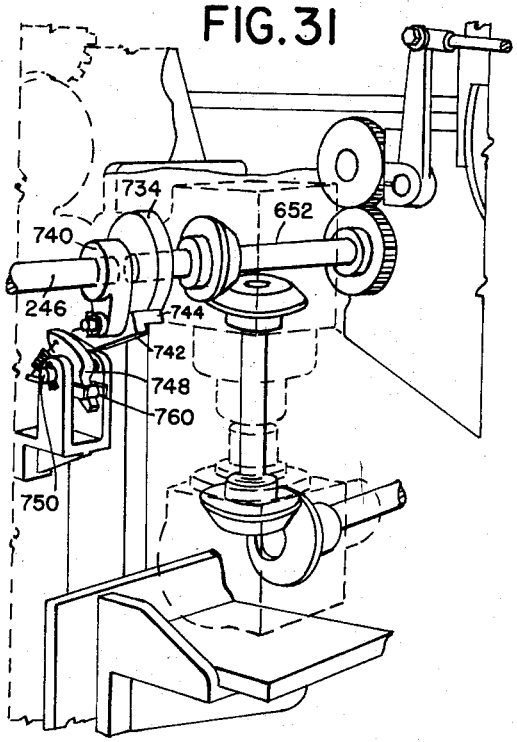
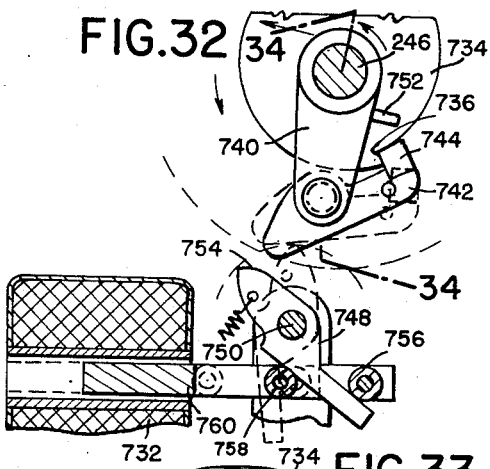
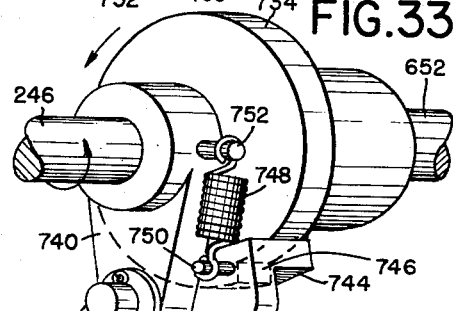
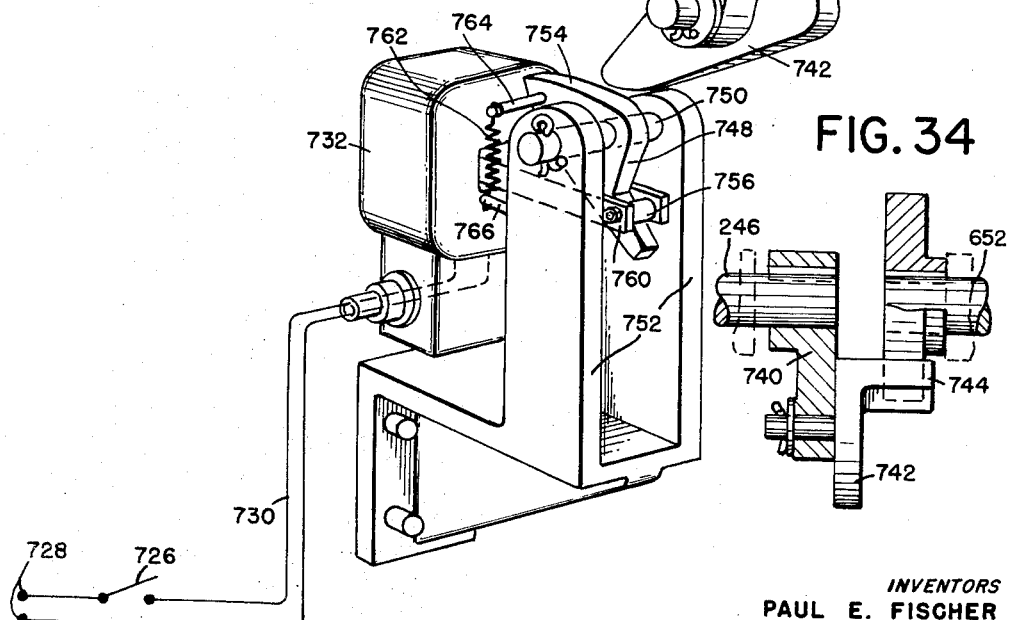
INVENTORS
PAUL E. FISCHER
ROBERT S. HEDIN
CHARLES H. SWANSON
HENRY E. WISSMAN
BY William C. Strueber, ATTORNEY

United States Patent Office 2,776,607
Patented Jan. 8, 1957

2,776,607

MECHANISM FOR PREPARING BLANKS

Paul E. Fischer, Minneapolis, Robert S. Hedin, St. Paul, Charles H. Swanson, Minneapolis, and Henry E. Wissman, St. Paul, Minn., assignors to General Mills, Inc., a corporation of Delaware Application March 31, 1952, Serial No. 279,619

3 Claims. (Cl. 93—36.6)

This invention relates to mechanism for preparing container blanks and more specifically to mechanism which will form and prepare blanks having multiple attached layers from a series of webs of container material.

In forming a container, the qualities which are to be possessed are usually dictated by the contents for which the package is designed. A container to be ideal for items such as foodstuffs and other perishables, must have some degree of physical strength to prevent damage to contents and to prevent breakage and consequent leakage of the package. Primarily, it must be air-tight and vapor-proof and, to be marketable, it must be attractive. If the container is for foodstuffs, it must be constructed so that the container material will not flavor or taint the food and will not impart any undesirable properties to the material contained therein. In order to achieve the multiplicity of necessary properties, containers must often be overdesigned. For example, more material than is necessary for strength may be used to gain airtightness etc. To accomplish only what is necessary with a minimum of cost, manufacturers have sought to form containers from a plurality of layers of material, each layer imparting to the container one or more particular advantages which it possesses. This often also results in a far superior container. Materials, such as paper, possess the quality of giving body to the container and are highly desirable because of their relative inexpensiveness. Where a thermoplastic adhesive, such as wax, is coated on the paper, it imparts thereto the property of forming an air and moisture barrier. Materials, such as metallic foil, are desirable when used on the inner surface of a container because they form a moisture barrier which will not permit the moisture contained in the food to escape from the food through the container walls. Further they present to the foodstuff a surface which will not flake or scale off, which has no odors and which will not in any way change the appearance or value of the food within the container. Further, foil, when used on the outside of the container surface forms a moisture barrier preventing moisture from either entering or leaving the package and, in addition, presents an extremely attractive package conductive to customer impulse buying.

In addition to these examples of container materials, various other substances can be used for forming packages. It will readily be seen that if a container having a plurality of layers of different types of material can be easily formed and the individual layers can be formed of very thin sheets of equal material, a container achieving the various properties of the materials can be formed and yet will be relatively low in cost.

Heretofore problems have been encountered in forming packages of many layers of material. When a plurality of layers of light weight material is assembled, difficulty is frequently encountered in that the various layers cannot be kept properly oriented and the dislocation of any one of the layers during the folding of the container will usually cause the formation of a defective container and may cause the container to leak and damage the contents. This difficulty of maintaining the various layers of the container blank in proper orientation is especially difficult in an automatic packaging machine which is run at high speeds.

One solution to this difficulty is to have the various layers of material laminated before they are formed into a container. This is undesirable in one respect in that the inner layers of the container have a tendency to wrinkle and the outer layers are placed under a strain when the layers are folded to form a container. This is due to the fact that the peripheral length taken around a tubular container is less for the inner layer than the outer and the layers try to compensate for this difference.

Another solution is to fold one layer at a time, wrapping successive layers over the layer first folded. This, however, takes additional time and additional operations, making it necessary to provide additional machinery and slows up the folding process.

A more satisfactory method of forming multiple layered containers is to fold the layers all at one time, but to leave them unattached, attaching or laminating them after the container is folded.

One object of the invention, therefore, is to provide a method and mechanism which will accurately assemble a plurality of sheets to form a multi-layered blank, attaching the sheets to each other within a limited area to hold them in their properly oriented position but allowing the sheets to slip with respect to each other when folded into a container.

Another object of the invention is to provide a mechanism which will sever blanks from a plurality of webs of different material and in rapid fashion, assemble and attach the blanks to each other and convey them to a container forming machine.

A further object of the present invention is to provide a method and mechanism which is capable of preparing and assembling a plurality of sheets of thermoplastic coated container material and attaching the sheets to each other in a limited area by activating the thermoplastic material.

Another object of the invention is to provide a method and mechanism of accurately laying successive sheets of thermoplastic coated material on other sheets in high speed operation, and securely attaching the successive sheets to the other sheets in a selected area so that they will remain in their relative positions through successive folding operations wherein the multiple sheets are made into containers.

Other objects and advantages will become apparent in the following specification taken in connection with the accompanying drawings in which:

Figure 1 is a perspective view schematically illustrating the manner in which the container web material is fed into the machine to be formed into container blanks;

Fig. 2 is a perspective view of the outer sheet of the container blank as cut at station I of the preparing machine;

Fig. 3 is a perspective view showing the intermediate sheet of the container blank prepared and attached to the outer sheet;

Fig. 4 is a perspective view showing the inner sheet of the container blank as prepared and attached to the outer and intermediate sheets of the blank;

Fig. 5 is a sectional view taken along line 5—5 of Fig. 2, illustrating a preferred composition of the outer sheet of the container blank;

Fig. 6 is a sectional view taken along line 6—6 of Fig. 3, illustrating a preferred composition of the intermediate sheet of the container blank;

Fig. 7 is a sectional view taken along line 7—7 of Fig. 4, illustrating a preferred composition of the inner sheet of the container blank;

Fig. 8 is a perspective view illustrating the end of the blank preparing machine;

Fig. 9 is a sectional view taken along 9—9 of Fig. 8 to illustrate the internal structure of adjusting mechanism for the edge de-curling device;

Fig. 10 is a sectional view taken along line 10—10 of Fig. 9;

Fig. 11 is a sectional view taken along line 11—11 of Fig. 8 showing the structure of the edge decurling bars;

Fig. 12 is a sectional view taken along line 12—12 of Fig. 8;

Fig. 13 is a detailed front elevation showing the means for adjusting the web decurler;

Fig. 14 is an elevational view taken from the rear side of the machine illustrating the front end of the machine which forms the first or outer sheet of the container blanks;

Fig. 15 is an elevational view of the same portion of the machine as shown in Fig. 14 but taken from the front side of the machine;

Fig. 16 is a front elevation of the end of the machine which is shown in Figs. 14 and 15, the view having a portion of the machine cut away to illustrate the path of the web;

Fig. 17 is a sectional view taken along line 17—17 of Fig. 16;

Fig. 25 is a front elevation of the second blank preparing station of the machine wherein the intermediate sheet of the blank is applied to the outer sheet, the front portion of the machine having been removed to show the paths of travel of the sheets;

Fig. 26 is a perspective view taken from the rear side of the machine schematically showing stations I and II and showing the discharge end of the machine in detail;

Fig. 27 is a perspective view showing the details of the discharge end of the machine;

Fig. 31 is a detailed perspective view of the drive clutch for connecting the blank preparing machine to its prime mover;

Fig. 32 is an enlarged view partially in section illustrating features of the clutch;

Fig. 33 is an enlarged perspective view illustrating features of the clutch; and Fig. 34 is a sectional view taken along line 34—34 of Fig. 32.

Figure 18:
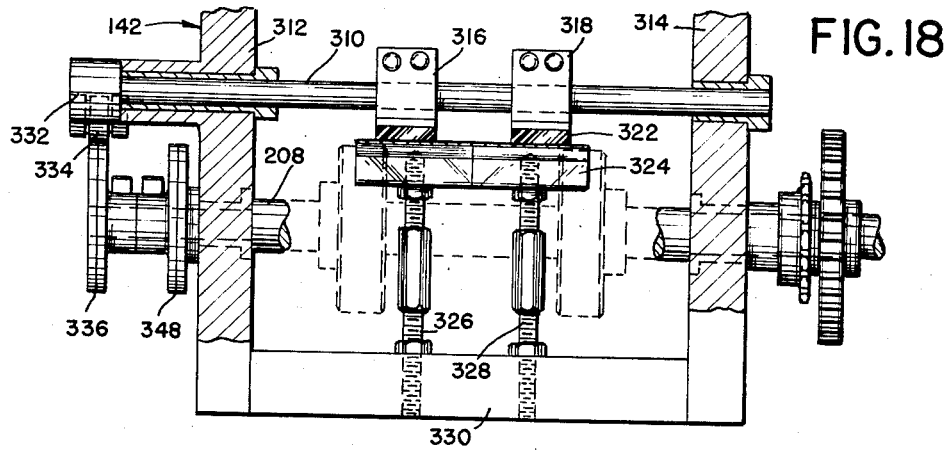
Fig. 18 is a sectional view taken along line 18—18 of Fig. 16.

The machine, shown schematically in Fig. 1, illustrating the preferred embodiment of the invention, assembles and joins together three sheets of material, each forming a separate layer of the blank to form a composite blank, shown as completed in Fig. 4.

The outer sheet 40 is shown complete in Fig. 2. This sheet is prepared by being severed from the end of a web 42 (Fig. 1) fed from a roll 44 at the head end of the machine. Short lateral slits 46 are formed on each side of the blank to provide a closing flap for the container. The dotted lines 48 indicate the folding lines for forming the container and hence indicate the location of the corners and edges of the completed container. These may be present in the blank as score lines, but are shown here merely to indicate the boundaries of the walls of the container. The area 50, for example, closed by the dotted lines 48 and 49, and the area 52, enclosed by lines 48 and 51 represent adjoining side walls. The remaining areas 53 and 55 on either side of these are the opposing side walls. The narrow strip 57 will overlap side wall 53 to form a seam when the container is folded. The panels between dotted lines 59 and 61 and the edges of the blank will be folded across the ends of the container to form the end walls.

After the outer sheet 40, of Fig. 2, is formed, the intermediate sheet 54, Fig. 3, is formed by being severed from the end of a web 56 fed to the machine from a roll 58. This intermediate blank is then attached to the outer blank by being joined thereto over the area 60, as indicated by the configurations on the drawing. It is to be noted that the area of attachment 60 lies within the area of one of the side walls 50 of the outer blank. This enables the two layers of the blank to slide with respect to each other, when they are folded along the dotted lines 48 and 49.

To this assembly of the outer and intermediate sheet of the double blank is attached the inner sheet 62, Fig. 4. The inner layer is prepared by being cut from the end of a web 64, fed to the machine from a roll 66, and the blank is then attached to the blank assembly by being secured to the intermediate blank at the area marked by the configuration 68, as shown in Fig. 4. Again, this area of attachment lies within the same wall 50 of the container, thereby also enabling slippage to occur between the inner and intermediate blank when the blank is folded to form the container.

Figs. 5, 6 and 7 illustrate a construction of each of the sheets, although it is to be understood that the blank should not be limited to using this exact material for its layers. The preferred sheets, for example, use thermoplastic as an adhesive whereas other adhesives may be used obtaining many of the advantages of our invention. The outside layer, as labelled in Fig. 5, has an outer facing of metallic foil coated with a layer of thermoplastic such as wax which is covered by a porous paper. These particular layers have the faculty of making the finished package attractive, making the container air-tight, providing a thermoplastic adhesive for laminating the container, and providing a paper to lend body to the container. The paper also forms a separation between the wax and the foil permitting the material to be rolled on rolls.

As labelled in Fig. 6, the intermediate layer is comprised of a layer of paper coated on either side with wax.

The inside layer, shown in Fig. 7, is comprised of a layer of metallic foil which faces the interior of the container. The layer of wax is coated on the foil and paper covers the wax. The finished container formed from these three blanks will have a layer of foil on the outer surface, a layer of foil on the inner surface and an intermediate material formed of layers of paper permeated with wax or other thermoplastic. This permeation is accomplished after the container is folded when the entire container wall is laminated by the application of heat and pressure to soften the thermoplastic and cause it to penetrate through the layers of material. The various layers will adhere to each other forming a monolithic package wall. Since it is desirous that the layers of material be allowed to slide with respect to each other when folded into a package to obviate the possibility of wrinkles in the finished container, the container walls are not laminated until after the container is formed. The multiple layers forming the blanks, however, must be held in their respective positions until the container is folded if a properly formed container is to be obtained. Therefore, the blanks are attached to each other but only along a limited area.

Following the schematic showing of Fig. 1, a brief description of the process of forming the blank will first be given. The mechanism for preparing the first blank will be called, for convenience of reference, station I. The outer layer of the container is formed from a web 42 drawn from a roll 44, the web first passing over a decurler 70 and around an idler roller 72 past a registering light 74 and past an edge decurler 76. The web then passes over upper guide rollers 78, 80 and 82 and down through a pair of drive rollers 84 and 86 which continuously draw the web from the roll. The web then passes under a guide roll 88 and past a brake 90 which intermittently locks the travel of the web. A roller 92 with a high drive speed has the web intermittently held against it by a roller 94. When the roller 94 is raised so as to permit the roller 92 to rotate without driving the web, the break 90 clamps the web. While the web is locked by brake 90, drive rollers 84 and 86 continue their rotation to form a loop 96 in the web between the guide roll 88 and the drive rolls 84 and 86. During this time when the web is locked, the knife assembly supported on a reciprocating head 98, lowers to sever the blank 40 from the end of the web. The cutting knife 100 cuts the blank from the end of the web and, with the same descending motion of the knife-supporting head, the knives 102 form the lateral slits 46 in the edges of the web. These slits will appear in the next blank cut from the end of the web.

At this point the raised portion 104 on the take-out roller 106 moves up to engage the blank 40 carrying it against the roller 108 to convey the blank away from the cutters. It is then conveyed through the machine on the conveyor shown schematically by the dotted lines 110. The outer sheet 40 is then carried between the rollers 114 and 116, the upper roller having a heated axially extending crossbar 111 on the surface. This heated bar softens the thermoplastic coating on the sheets and causes them to adhere together.

The intermediate blank 54 which is joined to the outer blank is cut from the web 56 which is fed up over roller 112 and 113 from the roll 58, mounted on the end of the machine. It is then carried through the decurler 115 and over a series of rolls 117 and past guide rolls 118 and 119, drawn by drive rolls 120 and 121. A roll 122 carrying a severing knife 123 severs the blank 54 from the web. This mechanism, for convenience of reference, will be called station II.

The outer and intermediate blanks, now joined to each other, are carried along the conveyor 110 to station III where the inner sheet is joined to the combination to form a completed blank. The mechanism of station III for preparing the outer blank is very similar to that of station II. The inner blank is prepared from a web 64 on a roll 66 mounted at the side of the machine. The web is fed past a series of feed rolls leading to the top of the machine and over an angled roller 128 to bring the paths of the web in line with the conveyor 110. The web is then drawn by feed rolls 123 over roll 125 and past a cutter roll 124 carrying a knife 126 which severs the end from the web to form the blank 62. The blank is carried down over the roller 130 where a limited area of thermoplastic is heated by the heating bar 132. As the joined outer and intermediate blanks pass between the rollers 130 and 134, the inner blank 62 is positioned upon the two blanks and joined thereto by the strip of softened thermoplastic adhesive. This strip is positioned adjacent the attaching strip of the inner and intermediate blanks but lies within the confines of the same side wall of the container blank which is capable of being formed into a container and which are securely attached to each other in their properly oriented positions. The blanks are attached over a limited area which permits the remaining areas to slide when folded. It is to be noted that the attachment area between the sheets preferably extends linearly in a line across the blank. This line of attachment will be parallel to the axis of the container and will permit slippage between the sheets in the lateral direction of the container no matter whether the container be multi-sided or cylindrical.

Each blank is positioned on the lower blank slightly offset from it to leave an edge of the lower blank exposed. This exposed portion will overlie the other end of the blank to form a seam. As will be recognized by the arrangement of the three sheets, the three seams will be offset from each other and not occur on top of each other as they would if the sheets were not offset.

Proceeding now to a more detailed explanation of the machine, Fig. 8 shows one end of the machine for carrying the roll 44 of material 42 for forming the outer sheets. As the material is drawn from the roll, over-coasting of the roll is prevented by a brake 136 which consists of a brake drum 138 secured to the shaft 140 which supports the roll on the main frame 142. The shaft is rotatably supported in brackets 144 secured to the frame. A brake band 146 passes around the drum, being fixed to the frame at 148 and having a free end attached to a pivotal arm 150 weighted on its free end so as to pull the band taut around the drum. To release the brake and prevent tearing of the web material in case the roll sticks, a rod 152 is pivotally attached to a boss 154 at the side of the arm 150. Raising this rod will pivot the arm 150 upwardly to release the tension on the brake band 146 to permit the drum and roll to rotate freely. To lift the rod 152, the upper end is connected to an arm 156 pivoted on the frame and which, with a similar arm 158, carries an idling roller 72 under which the web passes after passing over decurler roller 70.

As the web material is drawn upwardly into the machine and the supply roll 44 rotates freely, the tension on the paper will be small and the arms 156 and 158 carrying the roller will rest in their downward position to permit tension on the brake band 146. A knurled adjusting nut 162 is threaded to the end of a fitting 164 attached to the end of the brake band 146 and protruding from a sleeve 166 secured to the arm 150. This nut serves to adjust the tension of the band.

In case the roll 44 sticks, or in the event of a rapid withdrawing of the web material such as occurs in the starting of the operation of the machine, the tension on the material becomes great and the arms carrying the roll 72 are lifted thereby lifting the rod 152 and pivoting the lever arm 150 upward to loosen the tension on the brake band 146. This permits free rotation of the roll 44.

To prevent the roll 72 from dropping completely down when the web becomes slack or to prevent it from lifting too far up, a limiting spool 163 is secured on the rod 152. The spool rests between the ends of a forked support 165 secured to the frame, and upper and lower flanges 167 permit only limited up and down movement of the spool to limit the positions of the roller 72.

Because the material is wound on the supply roll 44, it acquires a curvature or curl which is removed by the decurler mechanism 70. The decurler consists of a roll 168 having a decurler bar 170. The decurler bar is positioned closely adjacent the roller 168 and is positioned so that the web material is creased over the bar as it passes from the supply roll 44 to the roll 168. The position of the decurler is adjustable with respect to the roll so as to be able to vary the sharpness of crease and hence the curling effect.

The decurler bar, as shown in Figs. 8, 12 and 13, is supported between a pair of arms 172 and 174 pivotally hung on the shaft which supports the roller 168. The pivotal position of the arms determines the position of the decurler bar and is controlled by worm gear having a gear 176 and driving worm 178 adjustably rotated by a knurled adjusting knob 180. The assembly, consisting of the decurler bar 170, the roller 168 and adjusting mechanism, is supported on brackets 182 and 184 projecting from the main frame 142. As shown in Fig. 12, a cross shaft 186 is rotatably mounted in the end of the brackets 182 and 184 and the roller 168 is rotatably mounted thereon by virtue of the bearings 188. The arms 172 and 174 carrying the decurler are secured to the shaft as is the gear 176. Rotation of the gear thereby adjusts the position of the decurler bar.

As the web 42 passes up through the decurler and beneath the roller 72, it moves upwardly over a vertical plate 190 supported on a U-shaped bracket 192 secured to the frame 142, as shown in Figs. 8, 14 and 15. Opposite the plate and contacting the outer surface of the web is another smaller plate 194 having a smaller aperture 196 therein so that the edge of the web is visible therethrough. Opposite this aperture is an electric eye mechanism 198 which is responsive to the darkened spots which are printed on the edge of the web at intervals equal to the length of the blank. A light source 200 shines against the web through the aperture to provide light for the electric eye mechanism.

The electric eye is electrically connected to a timer 202 which is driven in synchronism with the cutting mechanism by a chain 204 (Fig. 14) driven from a sprocket 206 on the cross shaft 208. The electric eye with its connected control mechanism including timer 202, controls the speed of feed of the web so that the blanks will be cut from the end of the web in proper lengths. When a signal from the electric eye mechanism indicates that the spots printed on the edge of the web are occurring early with respect to the cutting of the blanks, as indicated by the timer 202, then the feed of the web will be slowed to prevent the blanks from being cut of too long length. If the electric eye indicates that the spots are appearing late, then the feed of the web will be speeded up so as to cut blanks of proper length. This device also insures that, when printing appears on the blanks, the knife will sever the blank in the proper place in respect to the printing so that the printing will later appear within the limits of a certain side wall of the box.

A tightener sprocket 203 engages chain 204 and is carried on adjustable arm 205 to tighten the chain. To alter and control the speed of feed of the web a correction motor 210 (Fig. 14) is mounted at the top of the frame 142. This motor does not drive the web but merely enters corrective drive through differential gearing. Through bevel gearing 212, the motor 210 drives a shaft 214 carrying a worm gear pinion 216 to drive a worm gear 218 which rotates the shell carrying the planetary gears of the differential gearing in a well known manner. The roller 84 for feeding the web is mounted on the shaft 222 which carries gear 225 and is driven from gear 227 which is the output of the differential gearing indicated generally at 224.

With this arrangement, the drive roller 84 is driven from the output gear 227 of the differential but correction factors are put in by motor 210 running forward or backward to rotate the planetary section of the differential to influence the speed at which the web is fed.

As shown in the schematic drive of Fig. 26 and in Fig. 15, the input shaft of the differential gearing is 226 and is driven by means of the sprocket 228 driven by the chain 230 which runs over the drive sprocket 232 mounted on the shaft 208. A tightener sprocket 231 engages the chain 230 and is carried on an adjustable arm 233 for tightening the chain. The cross shaft 208, which also carries the sprocket 206 operating the timer 202, carries a gear 234 which is driven by idler pinion 236 which is rotated by gear 238 mounted on the shaft 240. This shaft is rotated by worm gear 242 driven by the pinion 244 mounted on the main driving shaft 246 which runs the length of the machine.

This longitudinal driving shaft 246 extends within a tube 247 and is driven by the power means through a clutch indicated generally at 248 which will later be described in detail. Power for driving the machine is received through shaft 250 which rotates the driver element of the clutch through bevel gearing 252 and the shaft is rotated through bevel gearing 254 from shaft 256 which through universal joints and connecting shafts and gearing is driven by a shaft 258 connected to the prime mover, not shown. The shafts 258 and 256 may also be suitably connected to other machinery, such as folding mechanism, shaft 258, shown carrying a cam 259 to operate such mechanism.

Referring back to Figs. 8 through 11, the device for decurling the edges of the web is illustrated. Due to changes in moisture content of the air, the paper, which constitutes one of the layers of the web, takes on different amounts of moisture and accordingly shrinks or expands. The metallic foil which forms one of the layers is not affected by this moisture in the air but will expand or contract in response to air temperature and the same amount of contraction or expansion is not experienced by the paper due to temperature. These expansions and contractions cause warpage or curl of the paper, and the warpage in the lateral direction of the web is manifested by the curling of the edges of material.

To relieve this curling and present a flattened web to shield blanks which are completely flat, an edge decurler 76 is provided consisting of uniquely shaped rods 260 and 262. These rods have straight fingers 264 which extend horizontally adjacent the path of travel of the web and at an angle to the vertical plane of the web to cause a bending of the web in a direction opposite of the direction in which the web has a tendency to curl. This is shown in detail in Fig. 11. The amount of pressure with which the fingers contact the web, and hence the amount of decurling effect experienced by the web, is controlled by altering the position of the arm. The arms have vertical supports 268, 270 which extend upwardly into holes in the brackets 272 and 274 which are mounted on a shaft 279 secured in the ends of brackets 276 and 278. The shaft 279 supports the upper roller 78 over which the web runs. These decurler supporting brackets 272 and 274 have studs with thumb screws 282 and 284 (Fig. 10) which, when tightened, project into the holes in which the supporting arms of the decurlers extend. To adjust the axial position of the decurlers or to swing them horizontally, the thumb screw is loosened and the decurler swung around to the desired decurling position and there locked by tightening the thumb screw.

The brackets 272 and 274 are adjustably secured to the shaft 279. The brackets are rotatably adjustable with respect to the shaft 279 to adjust the pressure between the decurlers and the web. Thumb screws 286 and 288, as shown in detail in Figs. 9 and 10, are threaded into the bracket and engage the fixed shaft 279 when tightened. To adjust the pressure between the web and the edge decurler fingers, the operator loosens the thumb screws 286 and 288 and rotates the brackets 272 and 274 which support the decurlers to move the decurler arms 264 and 266 toward or away from the web and then locks the decurler arms in the desired position by retightening the thumb screw. Thus both the pressure of contact and the angle of contact between the web and decurler fingers is adjustable to any degree.

As shown in Fig. 16, after the web has been drawn up over the roller 78 it passes along the supporting tray 290 and downwardly over roller 80 which is rotatably supported between the vertical sides of the frame 142. The web then reverses its direction and passes over roller 82 and, again reversing, passes down over the drive roller 84. A floating roller 86 is urged against the lower surface of the drive roller to clamp the web therebetween and insure positive drive of the web as the roller 84 rotates.

The roller 86 is rotatably journaled between a pair of supporting arms 298 which are secured to a shaft 300 pivotally mounted in the frame and which are pivotally urged upwardly by the spring 302 connected between the arms and the frame to press the roller 86 against the drive roller 84.

The web is shown looping down and passing under an idling roller 88 positioned above and slightly spaced from a plate 308 secured to the frame.

Figure 19:
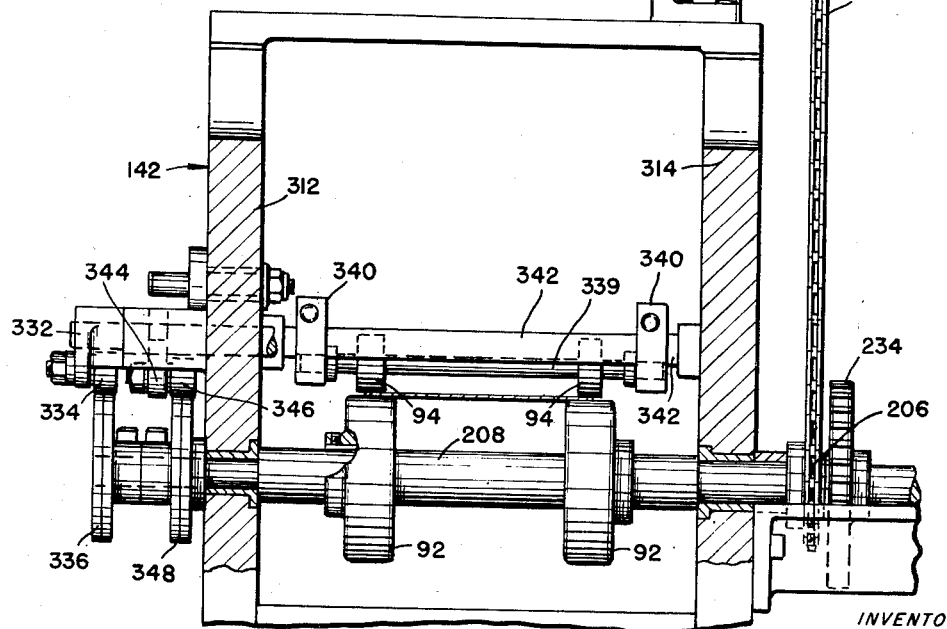
Fig. 19 is a sectional view taken along line 19—19 of Fig. 16.

The web 42 next passes through the brake 90, as shown in detail in Figs. 16 and 18. The brake functions to lock the web, preventing any motion thereof during the time when the cutter is severing a blank. The brake is mounted on a pivotal shaft 310 journaled to extend between the two vertical plates 312 and 314 which constitute the frame at this area of the machine. Clamped to the shaft 310 is a pair of arms 316 and 318 which carry at their lower ends faces 322 of resilient material which permit the web to be securely clamped without incurring damage thereto. The web is clamped against the lower plates 324 which is supported by posts 326 and 328, each formed of a pair of threaded members connected by a threaded connecting sleeve which permits the adjustability of the height. The posts are mounted at their base in the horizontal frame-piece 330. The brake alternately grips and releases the web by virtue of the pivotal movement of the shaft 310 which is controlled by crank arm 332 (Figs. 15, 17 and 19) which carries on its outer end a follower 334 which engages a cam 336 carried on the shaft 208. A tension spring 335 connected between the crank arm and the frame holds the follower 334 in engagement with the cam. As the cam rotates, it pivots the crank arm 332 to pivot the shaft 310 and cause the brake to alternately release and lock the web.

Operating in timed relationship to the brake are the intermittently operative feed rollers 92 and 94 positioned below and above the web (Figs. 16, 17 and 19) which draw the web forward from the drive roller 84. Because the drive roller 84 rotates continually, a loop of material indicated at 96 will be formed when the lower intermittent feed rollers 97 and 94 are not in operation and the web is locked by the brake 90. When the web is unlocked and the intermittent feed roller again forwards the material, the material is drawn forward at a greater speed than it is fed by the upper drive roller so as to eliminate the loop 96 which is formed. The feed roller 92 is arranged to have a greater peripheral speed than the drive roller 84 so as to remove this loop and to draw the material taut between the drive roller 84 and idler roller 88, just before the feed roller ceases to feed the material and is locked by the brake 90. The intermittent feed rollers rotate continually but do not feed the material unless the material is clamped tightly thereagainst by the overhanging rollers 94. These are carried on a shaft 339 between a pair of arms 340 clamped to the shaft 342 which is pivotally mounted between the frame plates 312 and 314, as shown in detail in Fig. 19. The clamping rollers 94 are lifted from the feed rollers 92 and brought into engagement therewith by the pivotal action of the shaft 342 which is controlled by a main arm 344. The arm 344 carries at one end a follower 346 which engages a cam 348 mounted on the shaft 208. A tension spring 347 (Fig. 15) connected between the arm and the frame holds the follower in engagement with the cam. Rotation of the cam 348 pivots the arm 344 to cause the rollers 94 to move to engagement with the feed roller 92 to drive the material or to move the rollers away from the feed roller to terminate the drive of the material.

The cams 336 and 348 operating the brake and the rollers for feeding the material are rotatably adjustable with respect to each other and are attached to shaft 208 as by clamps 349. The cams are adjusted so that as the rollers 94 raise to terminate feeding of the material the brake 90 will lock the material. As the rollers 94 move downwardly to press the material against the feed rollers 92, the brake releases, so that the material will be free, to be drawn forward.

For loading the machine with a fresh roll of web material, the end of the material to be inserted must be passed through the brake and between the feed roller 92 and the upper clamping roller 94. To move the clamping roller 94 away from the feed roller, a release arm 350 (Fig. 15) is provided. The release arm has an eccentric cam portion 352 and is pivoted on the frame so that pivotal movement of the arm will cause the eccentric cam 352 to engage the flat surface 354 of one end of the arm 344, forcing it downwardly to pivot shaft 342 and lift the clamping rollers 94 away from the feed rollers. The brake 90 is opened by merely lifting up on the arm 332 to lift the clamping shoe 322 away from the plate 324. The roller 86 is moved away from roller 84 by means of a release arm 351, Fig. 15, which has an eccentric cam, not shown, but similar to 352, which engages the end of one of the arms 298, Fig. 16, to pivot the roller 86 downwardly.

Referring again to Fig. 16, as the web 40 is fed forwardly, the forward end moves to the left from the severing knife 100 as it is moved ahead sufficiently to have a length of material projecting ahead of the cutter knife 100 equal to the desired length of the blank. The feed is halted, the material locked by the brake 90 and the knife subsequently descends to sever the blank from the end of the web.

Figure 20:
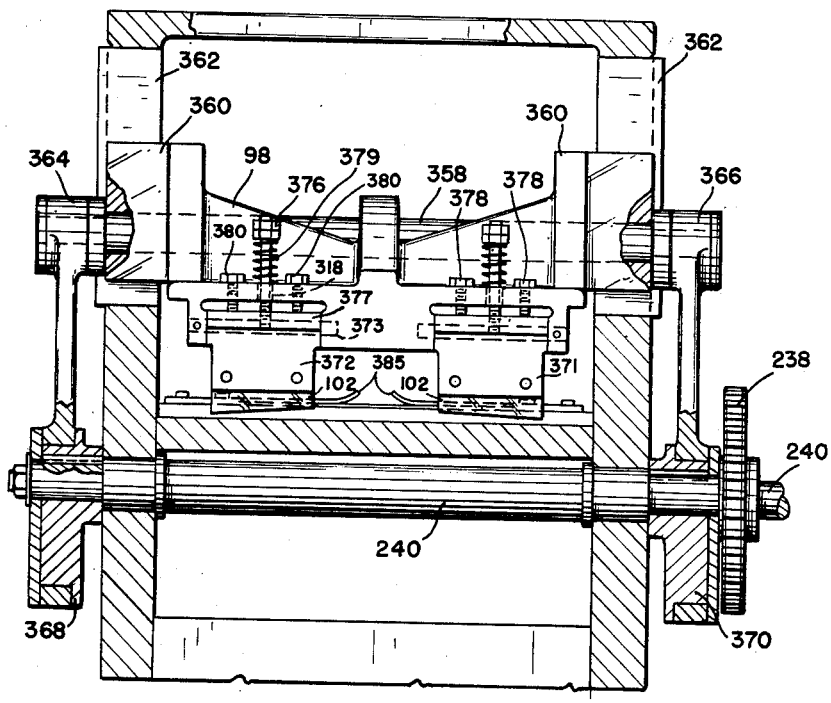
Fig. 20 is a sectional view taken along line 20—20 of Fig. 16.
Figure 21:
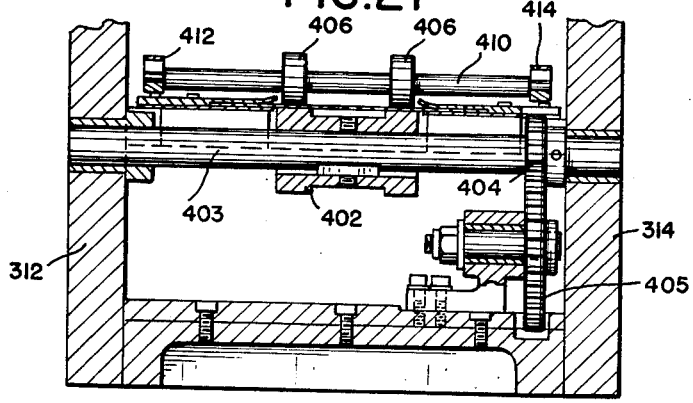
Fig. 21 is a sectional view taken along line 21—21 of Fig. 16.

The knife 100 is supported from and secured to the crosshead 98 which is arranged to move in vertical reciprocation. As shown in Figs. 15, 16 and 20, a cross shaft 358 extends through the crosshead 98 and protrudes on either side to have journaled on each end bearing blocks 360 which slide between vertical guides 362. Journaled to the outer ends of the shaft 358 are connecting rods 364 and 366 which are journaled at their lower ends to eccentrics 368 and 370 which are secured to a driving shaft 240 which is continually rotated. The mechanism for driving the shaft may be observed in Fig. 26. As the shaft 240 rotates, the action of the eccentric drives the cranks carrying the crosshead 356 up and down, moving the severing knife 100 in vertical reciprocation. Also supported from the crosshead are 4 slitting knives numbered 102 which form the short lateral slits (shown in Fig. 2 at 46). As will be observed in Fig. 16, these knives 102 are positioned behind the severing knife 100 and therefore the slits are formed in the web portion which will form the next succeeding blank. The blank 40, which has been severed from the end of the web, was slit by the previous cutting action.

The slitting knife 100 and cutting knives 102, as shown in Figs. 16 and 20, are each secured to L-shaped supporting members 371 and 372, which are pivotally secured to the crosshead on pins 373. The L-shaped members thus form pivotally hung bell cranks which permit adjustment of the cutting knife 100 and slitting knives 102 with respect to their cutting bars 374 and 375 which are secured to the frame. The knives are resiliently urged against the cutter bars by a bolt threaded into the upper arm 377 and which passes freely through a hole 378 in the knife carrying head 98. A coil compression spring is positioned between the head of the bolt and the member 98 to draw the bolt upwardly and urge the knife toward its cutting bar. Studs 380 threaded into the member 98 limit the pivotal movement of the members 372 which carry the knives. See Figs. 16 and 20.

The slitting knives 102 are tapered inwardly so that the outer edge is first to strike the blank thereby causing an improved cutting action against the cutter bar.

The slits formed in the edges of the web may cause the material on either side of the slit to curl. These curled edges may catch and wrinkle the sheet as the web moves forward through the machine. To avoid this, specially shaped guides 381 (Fig. 17) are provided behind each of the slitting knives. These guides are secured to the frame and one guide is positioned on each side of the web to extend above it just behind where the slit is formed.

Similar guides 382 are positioned behind the cutting knives 100 to prevent the trailing edge of the slit from curling upwardly and being wrinkled and torn. The guides have edges 383 which taper inwardly and which curve downwardly to gently guide the slitted web edges downwardly. The inner tips 385 curve upwardly.

Figure 22:
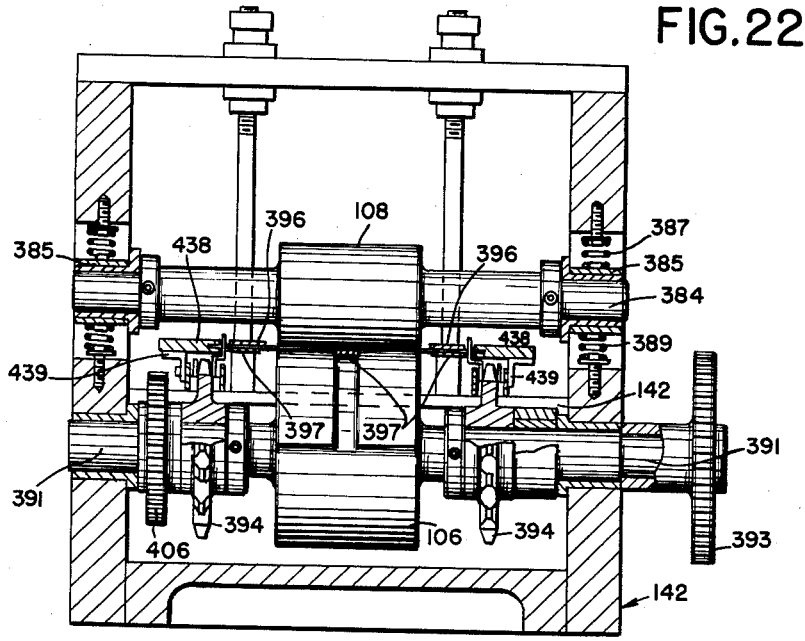
Fig. 22 is a sectional view taken along line 22—22 of Fig. 16.

As soon as the blank 40 has been severed from the end of the web, it is removed from its position against the knife 100 and carried onto the conveyor 110. To accomplish this (Fig. 16) a blank withdrawing roller 106, mounted on shaft 384, has a raised portion 104 which engages the blank and clamps it against the roller 108 to carry it forwardly. The upper roller 108 is freely suspended by having its bearings 385 (Fig. 22) suspended on springs 387 and 389.

When the blank is between the roller 108 and the portion of reduced diameter of roller 106, the blank is not carried forwardly but remains stationary. The blank is carried forward by the raised portion 104 to a position where the rear edge is engaged by the lug 390 of the conveyor chain 392 to be thus carried through the remainder of the machine. Conveyor chains 392 run over sprockets 394 which are on the shaft 384. Between supporting sprockets the chains are supported on chain guide rails 399. Shaft 391 also carries a gear 393 which is driven by gear 395, driven by gear 238, as shown in Figs. 16, 17 and 26.

Positioned above the conveyor chain to hold the blank flat and prevent it from curling up is a guide 396 suspended from a post 398 adjustably secured in a bracket 400 on the framework. Beneath the sheet are three supporting rails 397 on which the blank slides while pushed by the conveyor chain lugs.

An important feature of the invention is the mechanism for carrying forward the leading edge of the web after a blank has been severed therefrom. With the use of a fragile blank material not possessed with the usual stiffness, attempts to push forward a free end of material, especially at high speeds will cause wrinkling of the material and jamming of the machine. Therefore, a device has been provided to draw the material out from beneath the cutter blades so that the intermittent feed roller 92 will not have to push a length of webbing ahead of it.

As shown in Figs. 1, 16, 17 and 21, web advancing rollers 402 on shaft 403 are positioned slightly behind the severing knife 100. The shaft 403 carries a gear 404 driven by idler gear 405 which in turn is driven by gear 406, Fig. 16, on shaft 384. The web is forced against rollers 402 by rollers 406. These rollers are mounted on a cross shaft 410 which is rotatably mounted in slots in a pair of rocker arms 412 and 414 pivotally mounted on trunnions on the side framepieces 312 and 314. Tension springs 416 and 418, connected between brackets and the rocker arms, urge the rollers 406 downwardly to drive the web. Since the shaft 410 is journaled in slots, the rollers are floating and drive the blank by their weight.

The web is continually driven by the web advancing roller 402 except when the knives are lowered to sever and slit the material. As the knife assembly descends, a pair of adjustable pins 424 mounted on the knife carrying crosshead 98 strikes a flat surface 428 on one end of the rocker arms to cause them to pivot and raise the rollers 406. The pins 424 are adjustably set so that they will lift the roller 406, just as the knives 100 and 102 engage the web. As the knives lift, the roller 406 will begin to draw the forward edge of the web ahead.

As the conveyor chain lugs 390 engage the rear edge of the sheet 40, the blank is carried beneath the guides 396 (Figs. 22, 23 and 24) and over support rails 397. To keep the blank edges flat, channels in the guide bars 438 enclose the edges. The guide bars are supported by supporting braces 439 secured on the chain guide rails 399 and on the frame 142.

Figure 23:
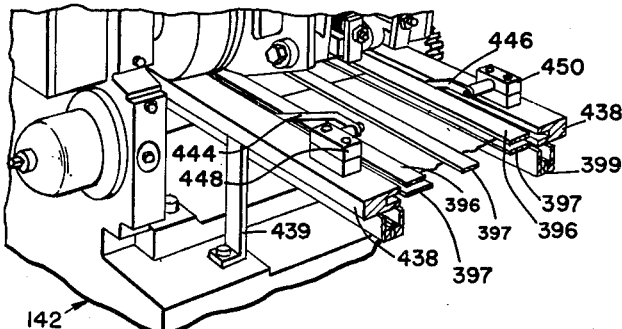
Fig. 23 is a detailed perspective view having portions of the machine removed for clarity, illustrating the approach of the blank to the second station where the intermediate blank is applied to the outer blank.
Figure 24:
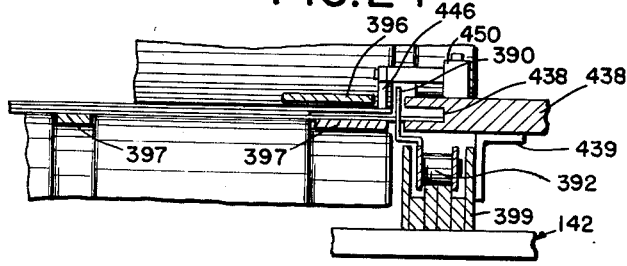
Fig. 24 is an elevational view of Fig. 23 illustrating the means for guiding the sheets or blanks through the machine.

To prevent the blank from bounding forward when engaged by the lugs of the conveyor chain, a pair of retarding fingers 444 and 446 are provided, shown in Fig. 23. These fingers are pivotally mounted on blocks 448 and 450 located on the guide bars 438 and ride on the blank as it is carried along in its guides.

After the outer sheet of the blank is prepared in the manner described above, it is carried to Station II where the intermediate sheet is laid upon it and secured to it so that the two blanks will maintain their proper oriented position with respect to each other.

The mechanism for preparing the intermediate layer of the blank is shown schematically in Figs. 1 and 26 and in detail in Fig. 25. The detailed mechanism shown in Fig. 25 is similar to the mechanism of Station III where the inner layer of the blank is prepared. Therefore, since the mechanism of the two stations is the same, only one station will be described. Mechanism of this type is also shown in the co-pending application, Mechanism and Method for Assembling and Attaching Container Blanks, Serial No. 279,616, filed March 31, 1952, by the present inventors.

As the web 56 is fed into station II, it is drawn from a roll 58 at the end of the machine. The web passes over a supporting tray 452 and downwardly over roller 118 rotatably supported on the upper end of posts 456 mounted on the frame section 458. The web continues downwardly over roller 119, reversing its direction to pass around roller 120. The web then passes between the roller 120 and the drive roller 121, around the drive roller 121 and past the clamping roller 466 which holds the web in positive engagement with the drive roller. The clamping roller is rotatably mounted on a pivotally mounted bellcrank 468 which has a spring 470 connected between it and the frame to urge the clamping roller against the drive roller. As the web passes between upper and lower guides 472 and 474, it passes over a cutting bar 476 adjustably mounted on a support 478 secured to the frame. The upper guide 472 is supported from a rod 480 adjustably secured to a bracket 482 mounted on the frame.

The forward end of the web passes over a tray 484 and is caught between the laminating roller 116 and the belts 488. The belts and roller which are traveling at a higher speed than the feed roller draw the web taut as it is severed by a knife 122 carried on a drum 123, the knife being carried past the cutter bar 476. When the blank 54 is severed from the end of the web, it is carried down between the laminating cylinder 116 and the belts 488 and engaged by a heating bar 111 having a face 498 exposed on the surface of the drum. This face is relatively narrow and extends axially as to engage the blank and soften the thermoplastic adhesive in a narrow strip across the blank.

The leading end of the web after the severing of the blank, is held downwardly by the shoe 502 mounted on the surface of the cutting drum 122. This insures that it will pass beneath the guide 504 rather than accidentally curling up and going over it.

The belts 488 are driven by roller 506 and pass over rollers 508 and 510 which are positioned so that the belt will contact a substantial portion of the arcuate surface of the laminating cylinder 116 to hold the blank against the heated bar 111. A tightener device 512 for the belts has rollers 514 engaging the belts, the rollers being mounted on a pivotal arm 516 which is urged to tightening position by a spring 518. The rollers over which the belts run are mounted on a frame 519.

As the blank 54 is carried downwardly, it meets the outer blank 40 and is positioned thereon. The two blanks pass between the pressure roller 114 and the laminating cylinder 116 and, as the area of softened thermoplastic adhesive passes between them, it is pressed tightly against the outer blank and adheres thereto. When the softened thermoplastic adhesive strikes the cooler outer layer, some of the adhesive immediately solidifies, firmly attaching the two blanks and the remainder solidifies as it has time to lose heat.

Separating fingers 524 extend into grooves 526 in the laminating cylinder to prevent the blanks from adhering to the cylinder and being carried upwardly. The blanks thus attached are carried by the conveyor chain beneath the guide 528 into station III where the inner blank is applied. The guide is supported on a rod 530 secured to a framepiece 532.

The mechanism for driving the apparatus for attaching the intermediate blank to the outer blank is shown in Fig. 26. It will be noted that the mechanism of station III for preparing and attaching the inner blank is very similar to that of station II and, therefore, only the driving mechanism of station II is described in detail.

The power shaft 534 for driving the station is driven off a main longitudinal shaft 246 through gears 536. A gear 538 on the one end of shaft 534 drives gear 540 mounted on shaft 542 which carries the laminated cylinder 116. The shaft 542 also carries gear 544 which drives gear 546 mounted on shaft 548, on which is mounted the roller 114. The gear 540 meshes with gear 550 secured on shaft 552 which carries the cutting cylinder 122. The shaft 552 also carries a pulley 554 driving a belt 556 passing over pulley 558 on drive shaft 560 which carries the pulleys 506 driving the pressure belts. Shaft 552 has a gear 562 driving idler gear 564 which drives gear 566 on the shaft 568 which carries the web drive roller 121.

Station III is also driven by a main shaft 570 being rotated through gears 572 driven off a longitudinally shaft 246. The remainder of the mechanism is similar to that of station II, excepting that the shaft 574 carrying the web drive roller 123 also carries a pulley 576 at its end. Driving belt 578 passes over pulley 580 to rotate shaft 582 which drives additional blank conveying mechanism to be described later. Sprockets 584 and 586 carrying the conveyor chain 392 are mounted for free rotation on this shaft.

After the outer layer of the blank has received the intermediate layer, it passes through station III between the laminating roller 130 and the pressure roller 134, where it receives the inner sheet 62. This inner sheet is attached, as shown in Fig. 4, to the intermediate sheet over a limited area 68 which lies within the limits of the same side wall of the container as the attachment 60 between the outer and intermediate sheets. The inner sheet is attached to the intermediate layer in the same manner as the intermediate layer was attached to the outer layer. That is, the laminating cylinder 130 has a heated bar 132 in its peripheral surface which softens the thermoplastic adhesive on the inner sheet. When laid over the intermediate blank, the sheet adheres thereto by the hardening of the thermoplastic upon contact with the cooler blank.

It is important that station III be timed with station II for two reasons. First so that the sheet will be laid on the two sheets in the proper relationship. Second so that the heated bar on the surface of the cylinder at station III contacts the blank at the proper location so that the area of adhesion between the blanks will lie within the bounds of the same side wall of the container to be formed as the area of adhesive between the first two sheets.

The three layers forming the composite container blank securely adhere to each other in their properly oriented positions, passing to the end of the conveyor chain 392 and are then conveyed at right angles thereto in the path indicated by arrow 577 in Fig. 1, to a subsequent machine which will fold the blanks to form a container.

As shown in Fig. 26, the blanks pass from the conveyor chain to a second conveyor which transfers them at right angles to the first direction of movement to a container folding machine. This second conveyor is indicated generally at 588 and is shown in greater detail in Figs. 27 through 30.

Figure 28:
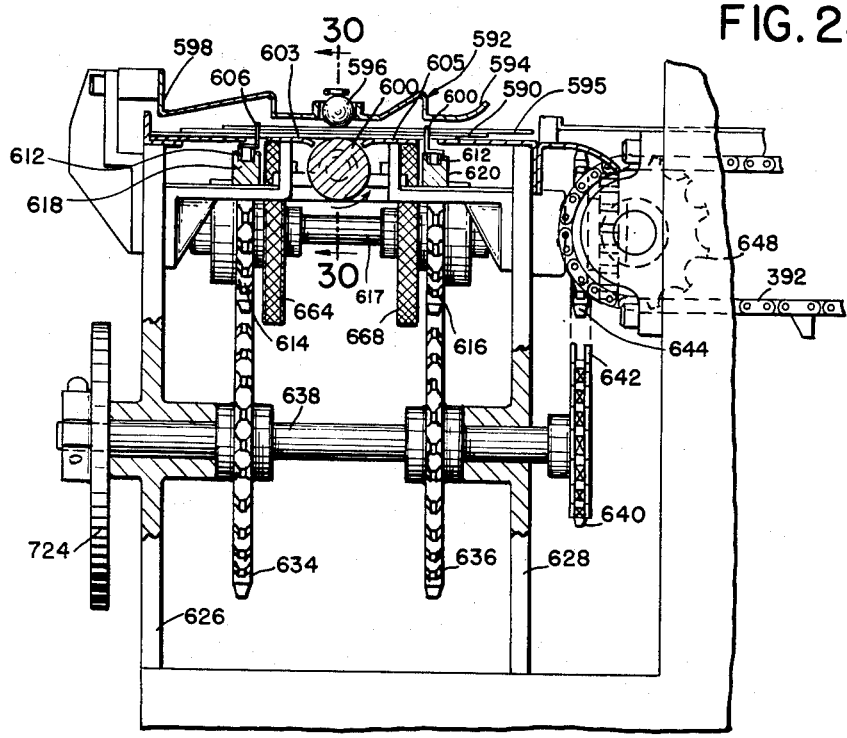
Fig. 28 is a sectional view taken along lines 28—28 of Fig. 27.
Figure 30:
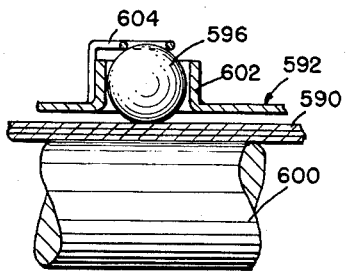
Fig. 30 is a sectional view taken along line 30—30 of Fig. 28.
Figure 29:
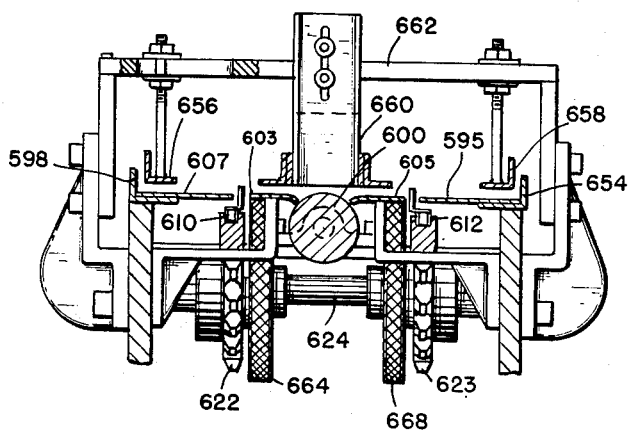
Fig. 29 is a sectional view taken along line 29—29 of Fig. 27.

In Figs. 27 and 28 the three layered blank 590 is illustrated as passing off the conveyor chain 392 onto the second conveyor beneath the guide plate 592. This plate has an upturned lip 594 on the leading edge to guide the blank therebeneath. The blank slides across the conveyor platform 595 beneath the retarding balls 596 against the stop 598. The roller 600 which rotates in counterclockwise direction, as shown in Figs. 28 and 29, carries the blank across the platform 595 and against the stop 598. The balls 596, as shown in detail in Fig. 30, bear down upon the blank 590 to press the blank frictionally against the roller. The retarding balls rest in pockets formed by an annular flange 602, extending above the guide 592, and a wire retainer 604 secured to the side of the flange is provided to prevent the retainer balls from accidentally coming out of the pockets. This roller continues to rotate beneath the blank holding it against the guide edge 598, assuring that the blank will be accurately positioned when it is carried into the succeeding machine. The roller is driven by a pulley 625 on its end driven by belt 627, driven by pulley 629 on shaft 582, Fig. 26.

When the blank is positioned against the stop 598, it rests on plate 595, on rails 603 and 605 and on rail 607 to which is attached stop 598. A pair of lugs 606 and 608 are carried up by the conveyor chains 610 and 612 to engage the edge of the blank and carry it transversely along the conveyor rails (Fig. 28). The conveyor chains pass over sprocket wheels 614 and 616 mounted on shaft 617 and ride in guides 618 and 620 during their course of travel when carrying the container blank.

At the far end of the transverse conveyor (Fig. 26) the conveyor chains pass over sprockets 622 and 623 secured to rotating shaft 624, which is journaled between vertical frame plates 626 and 628. The chain then travels downwardly over idler sprockets 630 and 632 mounted on shaft 634.

The chains are driven by sprockets 634 and 636 on shaft 638 which is driven by a sprocket 640, carrying chain 642, passing over a sprocket 644 which is rotatably mounted on a stub shaft 646. Also secured to this shaft is gear 648 driven by gear 650 which is mounted on the drive shaft 652 driven from a main drive shaft 250 through bevel gears 252.

It will be noted from Fig. 29 that the positioning roller 600 extends a considerable distance along the transverse conveyor to insure that the blank 590 will remain against the guide 598. A guide 654 is provided on the other side of the conveyor but it is desirous that the blank be accurately positioned against the outer guide for transferral to the succeeding container forming machine. Additional upper guides 656 and 658 are provided to keep the edges of the blank flat and a center guide 660 is provided to keep the center of the blank flattened. These guides are supported by support members which depend vertically from an overhead framepiece 662, the supports being adjustable.

As the blank approaches the left end of the transverse conveyor, as illustrated in Fig. 27, it is caught by knurled delivery wheels 664 and 668 against which the blank is pressed by floating pressure rollers 670 and 672 rotatably supported on pivotal arms 674 and 676 hung on a cross rod 678. These delivery wheels are mounted on the shaft 624 which carries the sprockets 622 and 623 supporting the conveyor chain and, being of a larger diameter than the sprockets, they have a greater peripheral speed. The blank is thus drawn away from the lugs on the conveyor chain and rapidly transferred into the container forming mechanism, shown as the edge of a rotating turret 680 in Fig. 27. The blank passes between guides 682 and 684 and is pushed against stops 686 by placement fingers 688. A plate 687 breaches the gap between the turret and the conveyor.

The fingers 688 are secured to a pivotal shaft 690 rotatably mounted at its ends in sliding blocks 692 and 694 which slide in ways 696 and 697 provided in framepieces 699 and 701 on either side of the conveyor. An additional rigid rod 698 extends between the sliding blocks 692 and 694. The blocks are slid back and forth in the ways by connecting links 700 and 702 (Figs. 26 and 27) which are rotatably connected at their ends to the blocks. Secured to each end of the shaft 690 are uniquely shaped blocks 704 and 706 which control the pivotal movement of the shaft 690 and hence the movement of the fingers 688. As the blocks move to the position of Fig. 27, the blocks 704 and 706 have a finger 708 which strikes a cam block 710 to cause the shaft 690 to pivot clockwise, bringing the positioning finger 688 down against the rear edge of the blank, forcing it against the stops 686. As the crossheads 692 and 694 are carried to the right, as shown in Fig. 27, fingers 708 are free of the blocks 710 and the tension springs 712, connected between an arm 714 and pins 715 on the blocks 704 and 706, pivots the shaft 690 in opposite directions, returning the fingers to their horizontal position where they do not interfere with the passage of the succeeding container blanks.

To slide the blocks 692 and 694 back and forth, Fig. 27, the links 700 and 702 are connected to a pivotal arm 714 pivoted on shaft 716 which is mounted on the framepiece 614. A short connecting link 718 is connected between the arm 714 and a bellcrank 720 which is pivotally mounted on a frame 614. The lower arm of the bellcrank carries a cam follower 722 engaging cam 724 which is mounted on shaft 638. The follower is held in engagement by spring 725 between the frame and bellcrank and the return of the blocks is aided by spring 727 connected from the frame plate 628 to the upper arm of the bellcrank 720.

It is frequently necessary to turn off the blank preparing section which is herein shown without turning off the remainder of the machine which is the portion for folding the containers. This occasion arises, for example, when it is desired to reload the blank preparing machine by inserting a new roll of container blank material. Further, since the container folding section uses the application of heat in forming the container, it should not be stopped with a heated member in engagement with the container as the thermoplastic will overheat and may catch fire. This portion of the machine should be kept running to clear the containers from the machine. The various sections of the machine are driven from the same prime mover and in order to permit independent stoppage of the container preparing section of the machine and synchronism with the rest of the machine, a clutch is provided. This clutch 248 is positioned between the drive for the remainder of the machine and the drive for the blank preparing portion of the machine.

It is to be noted that the main conveyor must be kept in synchronism with the transverse conveyor if the lugs of the transverse conveyor chain are to engage the edge of the container blank when it is in position over the conveyor.

Referring to Fig. 26, a switch 726 is positioned between the leads 728 which, when the switch is closed to stop the machine, completes the circuit to the clutch disengaging solenoid 732. The clutch, which is shown in detail in Figs. 31 through 34, has the driver element which constitutes a disk 734 with a notch 736 in the periphery secured to the driven shaft 652. The driven portion of the clutch comprises an arm 740 secured to the driven longitudinal shaft 246. The arm carries at its end a pivotally mounted pawl 742 having a block 744 at its end. The block 744 so protrudes from the pivotal arm 742 that it will engage the shoulder 746 of the notch in the disk 734 when in engaged position. A spring 748 connected between a pin 750 on the pawl and a pin 752 on the arm 740 urges the pawl to pivot so that the block will engage the notch in the disk, thus engaging the clutch.

It is to be noted that the two clutch members will engage in only one relative position, the position being when the block 744 is opposite the notch 736 in the disk. Thus when the pawl 744 is pivoted to disengagement, and again released to move to engaging position, the disk 734 will not begin to drive the shaft 246 until the notch in the disk has moved around to be in a position so as to engage the block 744. At this position, the shafts 652 and 246 are so relatively located that the blank preparing machine will be in synchronism with the remainder of the container machine and the blanks will be delivered by the preparing machine only at the proper time. The lateral conveyor which carries the blank directly to the folding machine is driven by shaft 652 and so continues operation when the clutch is disengaged.

For disengaging the clutch, a pivotally mounted dog 748 is journaled on a pin 750 extending across the opening in a U-shaped frame member 752 secured to the main frame. The upper face 754 of the dog is curved so as to act as a cam when the dog is pivoted clockwise, as shown in Fig. 32 or 33. When the dog moves clockwise to the dotted line position of Fig. 32, it cams the pawl 742 to disengaged position, as shown by the dotted lines. This releases the clutch.

To swing the dog to disengaging position, its lower end is cradled between a pair of pins 756 and 758 extending across a slot in the plunger 760 of the solenoid 732. When the solenoid is energized, the plunger moves to the left pivoting the disengaging pawl clockwise to engage the pawl and release the clutch. When the solenoid is de-energized a spring 762, connected between a pin 764 on the dog and a pin 766 on the solenoid frame, withdraws the solenoid plunger and pivots the dog so that it will release the pawl and permit the clutch to engage.

Thus it will be seen that we have provided a mechanism for preparing a plurality of sheets and orienting them and attaching them to form multiple layered blanks, having layers securely attached along a limited area. The mechanism is capable of operating automatically and at high speeds and is suitable for use with light-weight fragile materials, such as coated metallic foil. The mechanism is capable of utilizing a various number of different types of material, taking the materials from rolls and completely preparing them to a stage where they are ready to be formed into containers.

The machine is also efficient and compact and may be readily adapted for use with various types of container forming equipment. Blanks will be rapidly and accurately delivered to a container folding machine and the two machines may be operated from the same prime mover without interfering with their individual operation.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. The method of preparing blanks for a container which comprises forming a first sheet of container material, forming a second sheet of container material and positioning the second sheet on the first, one of said sheets having a coating of thermoplastic adhesive on the surface facing the other sheet, applying heat to a very small area of the sheets to activate the thermoplastic adhesive therebetween to cause the sheets to adhere to each other over only said limited area, forming a third sheet of container material and positioning it on said second sheet, one of said second and third sheets having a coating of thermoplastic on the surface facing the other sheet, and applying heat to said third sheet over a second very small area to activate the thermoplastic adhesive between the second and third sheet to cause them to adhere to each other over said second small area, the location of the second area being different from the first area so that the application of the heat to the second area will not re-soften the thermoplastic of the first area to loosen its bond.

2. The method of preparing blanks for a container which comprises forming a first sheet of container material with four aligned body panel areas adapted to form container body walls when the sheet is folded into a tube of rectangular cross section and with end flap areas adjacent said body walls, forming a second sheet of material of a width adapted to cover substantially only said body panel areas of the first sheet, positioning said second sheet on the first sheet in desired registry, securing the sheets together in a limited area located entirely within one of said body panel areas, forming a third sheet of container material adapted to cover at least a portion of said first two sheets including a plurality of said body panel areas, positioning said third sheet on the second sheet in desired registry and securing the third sheet to at least one of the other sheets in a limited area also located entirely within said one of said body panel areas, said three sheets being substantially free for relative movement with respect to each other throughout their remaining areas and thereby minimizing buckling and wrinkling during subsequent folding of the sheets.

3. The method of making a blank for a multi-layered container which comprises preparing three individual sheets of thermoplastic coated container material to be assembled to form a multi-layered blank, assembling the first and second sheets in the proper position for forming the container, applying heat to said first and second sheets over a first small area which lies entirely within an area representing one side wall of the container, to attach the first and second sheets, positioning the third sheet on the second sheet, and applying heat thereto over a second small area lying entirely within the area representing said side wall of the container, said second small area lying outside of said first small area so that when the heat is applied to attach the third sheet the attachment between the first and second sheets will not be loosened.

References Cited in the file of this patent

UNITED STATES PATENTS

| | | |
|---|---|---|
| 1,613,132 | Rosener | Jan. 4, 1927 |
| 1,762,702 | Smith | June 10, 1930 |
| 1,867,220 | Hartmann | July 12, 1932 |
| 2,075,037 | Hunter | Mar. 30, 1937 |
| 2,125,758 | Waters | Aug. 2, 1938 |
| 2,127,131 | Moeller | Aug. 16, 1938 |
| 2,142,243 | Greenwood et al. | Jan. 3, 1939 |
| 2,152,323 | Moore | Mar. 28, 1939 |
| 2,166,126 | Carruth | July 18, 1939 |
| 2,199,708 | Maxfield | May 7, 1940 |
| 2,353,419 | Smithson | July 11, 1944 |
| 2,479,456 | Arthur | Aug. 16, 1949 |
| 2,542,298 | Zinn | Feb. 20, 1951 |
| 2,649,672 | Thompson | Aug. 25, 1953 |

FOREIGN PATENTS

| | | |
|---|---|---|
| 454,095 | Canada | Jan. 18, 1949 |